United States Patent [19]

Höhlein et al.

[11] 4,304,695

[45] Dec. 8, 1981

[54] AIR-DRYING, FATTY ACID-MODIFIED LACQUER BINDERS, BASED ON FUMARIC OR MALEIC ACID BIS-GLYCIDYL ESTER COPOLYMERS

[75] Inventors: Peter Höhlein; Hans-Joachim Traenckner; Lothar Fleiter; Ludwig Bottenbruch, all of Krefeld, Fed. Rep. of Germany

[73] Assignee: Bayer Aktiengesellschaft, Fed. Rep. of Germany

[21] Appl. No.: 181,043

[22] Filed: Aug. 25, 1980

[30] Foreign Application Priority Data

Aug. 29, 1979 [DE] Fed. Rep. of Germany ....... 2934950

[51] Int. Cl.³ .......................................... C08F 220/32
[52] U.S. Cl. .......................... 260/23 EP; 260/23 CP
[58] Field of Search .......... 260/23 EP, 23 CP, 23 AR

[56] References Cited

U.S. PATENT DOCUMENTS

| | | | |
|---|---|---|---|
| 3,919,146 | 11/1975 | Emmons | 260/23 EP |
| 3,988,273 | 10/1976 | Tetsuo | 260/23 AR |
| 4,100,045 | 7/1978 | Bogan | 260/23 EP |
| 4,107,114 | 8/1978 | Nakayama | 260/23 AR |
| 4,129,537 | 12/1978 | Dhein et al. | 260/23 ET |
| 4,199,487 | 4/1980 | Nakayama | 260/23 EP |

FOREIGN PATENT DOCUMENTS

| | | |
|---|---|---|
| 729883 | 5/1955 | United Kingdom . |
| 776771 | 1/1957 | United Kingdom . |
| 767476 | 2/1957 | United Kingdom . |
| 793776 | 4/1958 | United Kingdom . |
| 1227398 | 4/1971 | United Kingdom . |

*Primary Examiner*—Paul R. Michl
*Attorney, Agent, or Firm*—Connolly and Hutz

[57] ABSTRACT

A binder composition which has a number average molecular weight of from 1000 to 20,000 and which comprises, in copolymerized form, from 5 to 55% by weight of fumaric acid and/or maleic acid bis-glycidyl ester and from 95 to 45% by weight of one or more vinyl and/or vinylidene monomers, esterified to an acid number of from 3 to 30 mg KOH/g with from 18 to 72% by weight, based on copolymer plus fatty acid, of a fatty acid and subsequently reacted with 0 to 3% by weight, based on copolymer plus fatty acid plus dicarboxylic acid anhydride, of a dicarboxylic acid anhydride.

2 Claims, No Drawings

AIR-DRYING, FATTY ACID-MODIFIED LACQUER BINDERS, BASED ON FUMARIC OR MALEIC ACID BIS-GLYCIDYL ESTER COPOLYMERS

This invention relates to air-drying lacquer binders of copolymers of vinyl compounds, vinylidene compounds and fumaric or maleic acid bis-glycidyl esters which are esterified with drying fatty acids or mixtures thereof before or after copolymerisation.

It is known that copolymers of styrene and glycidyl methacrylate may be reacted with drying fatty acids in such a way that the carboxyl groups of the fatty acid are added with the epoxide groups of the copolymer, the thus-obtained reaction products being used as air-drying lacquer binders (cf. British Pat. No. 767,476).

It is also known that copolymers of glycidyl (meth)acrylate and vinyl or vinylidene monomers may be reacted with drying fatty acids and the thus-obtained reaction products used as air-drying lacquer binders. "Vinyl or vinylidene monomers" are to be understood to be vinyl toluene, (meth)acrylonitrile and (meth)acrylic acid esters (cf. British Pat. No. 793,776).

A major disadvantage of the binders according to the above references lies in the lacquer gloss of the pigmented lacquers which is caused by inadequate wetting of the pigments.

According to German Offenlegungsschrift No. 1,720,697, this disadvantage may be obviated by producing copolymers of at least one vinyl monomer and at least one comonomer containing epoxide groups, esterifying the thus-produced copolymers with drying fatty acids and reacting the hydroxyl groups formed during esterification with a dicarboxylic acid anhydride to form semi-ester groups. Acid numbers of from 20 to 60, based on the binder, are required for obtaining an adequate effect.

However, like many air-drying lacquers, the finished lacquer formulations show a tendency towards undesirable skin formation and thickening when stored in tins, so that they require the addition of an anti-skinning agent. Unfortunately, the addition of an anti-skinning agent leads to considerable delays in drying, even under the same drying conditions, so that binders of the type in question are unsuitable for the production of air-drying lacquers.

One solution to the above problem is described in German Offenlegungsschrift No. 2,647,314, according to which the air-drying binders disclosed in German Offenlegungsschrift No. 1,720,697 are modified in such a way that the delays in drying caused by the addition of the anti-skinning agent are compensated by the addition of a certain mixture of natural and isomerised, drying fatty acids, followed by acidification using a particular dicarboxylic acid anhydride. In addition, the use of the fatty acid mixtures remains limited to a maximum quantity of 50%, by weight, so that this type of binder is excluded from the applications of the long-oil alkyd resins.

An object of the present invention is to produce air-cross-linking lacquer binders which avoid the disadvantages referred to above in regard to delays in drying, lack of gloss, limitation to certain fatty acid mixtures and limitation to the medium-oil range.

Accordingly, the present invention relates to air-drying lacquer binders having average molecular weights ($M_n$) of from 1000 to 20,000 and acid numbers (AN) of from 3 to 30 mg of KOH/g of substance based on copolymers or copolymerised units of:

from 5.0 to 55.0%, by weight, of at least one glycidyl ester of an unsaturated carboxylic acid; and
from 95.0 to 45.0%, by weight, of at least one vinyl or vinylidene monomer or mixtures thereof;

which have been esterified to an acid number of from 3 to 30 mg of KOH/g of substance using from 18 to 72%, by weight, based on copolymer and drying fatty acid, of at least one drying fatty acid and then reacted with from 0 to 3%, by weight, based on copolymer and drying fatty acid and dicarboxylic acid anhydride, of at least one dicarboxylic acid anhydride, characterised in that the glycidyl ester of the unsaturated carboxylic acid is fumaric or maleic acid bis-glycidyl ester or a mixture of these bis-glycidyl esters.

The bis-glycidyl ester of fumaric or maleic acid is known (cf. German Auslegeschrift No. 1,030,325 and British Pat. No. 729,883).

Examples of suitable vinyl or vinylidene monomers are: styrene, $\alpha$-methyl styrene, o- or p-chlorostyrene, o-, m- or p-methyl styrene, p-t-butyl styrene and, optionally, mixtures thereof, acrylic and methacrylic acid alkyl esters containing from 1 to 8 carbon atoms in the alcohol component, for example ethyl acrylate, methyl acrylate, n- or iso-propyl acrylate, n-butyl acrylate, 2-ethyl hexyl acrylate, 2-ethyl hexyl methacrylate, iso-octyl acrylate, t-butyl acrylate, methyl methacrylate, ethyl methacrylate, n- or iso-propyl methacrylate, butyl methacrylate, iso-octyl methacrylate and optionally, mixtures thereof; hydroxy alkyl(meth)acrylates containing from 2 to 4 carbon atoms in the alkyl group, for example, 2-hydroxy ethyl(meth)acrylate, 2-hydroxy propyl(meth)acrylate, 4-hydroxy butyl(meth)acrylate; trimethylol propane mono(meth)acrylate, pentaerythritol mono(meth)acrylate or mixtures thereof; diesters of fumaric acid, itaconic acid, maleic acid containing from 4 to 8 carbon atoms in the alcohol component; acrylonitrile, (meth)acrylic acid amide, vinyl esters of alkane monocarboxylic acids containing from 2 to 5 carbon atoms, such as vinyl acetate or vinyl propionate, or mixtures of the above-mentioned monomers, N-methoxy methyl(meth)acrylic acid amide.

Preferred monomers are styrene and (meth)acrylic acid alkyl esters containing from 1 to 8 carbon atoms in the alcohol component and mixtures thereof.

The copolymer resin may be produced by copolymerising the constituents in the conventional way, preferably by radical polymerisation in the melt or in solution. Polymerisation may be carried out at temperatures of from 70° to 160° C., preferably from 100° to 150° C.

The monomers are incorporated into the copolymer resin in substantially the same ratios as used for polymerisation, the copolymerised units being substantially statistically distributed.

Preferred initiators for carrying out the radical polymerisation reaction are, for example, symmetrical aliphatic azo compounds, such as azo-bis-isobutyronitrile, azo-bis-2-methyl valeronitrile, 1,1'-azo-bis-1-cyclohexane nitrile and 2,2'-azo-bis-isobutyric acid alkyl ester; symmetrical diacyl peroxides, such as acetyl, propionyl or butyryl peroxide, benzoyl peroxides substituted by bromine, nitro, methyl or methoxy and lauroyl peroxide; symmetrical peroxy dicarbonates, such as diethyl, diisopropyl, dicyclohexyl and dibenzyl peroxy dicarbonate; t-butyl peroctoate or t-butylphenyl peracetate and also peroxide carbonates, such as t-butyl-N-(phenyl peroxy)-carbamate or t-butyl-N-(2,3- dichloro or 4-chlorophenyl peroxide)-carbamate. Other preferred peroxides are t-butyl-hydroperoxide, di-t-butyl peroxide, cumene hydroperoxide, dicumene peroxide and t-butyl perpivalate.

The initiators may be used in quantities of from 0.2 to 15%, by weight, based on the monomer total. Conventional regulators may also be used during polymerisation in quantities of from 0.1 to 10%, by weight, based on the monomer total.

Where polymerisation is carried out in solution, it is possible to use one or more inert solvents such as ethanol, propanol, iso-propanol, n- or iso-butanol, methyl ethyl ketone, toluene, xylene, butyl acetate, butyl glycol etc.

After they have been produced and optionally subjected to modification, the copolymers may be freed from volatile constituents at temperatures of from 140° to 200° C. This may be done, for example, either under normal pressure in tubular coil evaporators by blowing in an inert gas, such as nitrogen or hydrogen, in quantities of from 0.1 to $1_m^3$ per kg of resin melt or in vacuo in evaporation apparatus, such as falling-film evaporators, thin-layer evaporators, screw evaporators, flash evaporators or spray evaporators.

The addition of the drying fatty acid with the copolymers containing epoxide groups is carried out preferably in the absence of catalysts, at temperatures of, generally, from 60° to 200° C., preferably from 100° to 170° C., and is continued to the required acid number.

In one embodiment of the process, the reaction of the fatty acid with the monomer containing glycidyl groups may be carried out as an independent reaction before copolymerisation or in one and the same stage as, i.e. during, copolymerisation. The addition of the fatty acid with the epoxide group is preferably carried out after copolymerisation.

The drying fatty acid may be used in quantities of from 18 to 72%, by weight, preferably from 25 to 65%, by weight, based on the solid resin (=copolymer+fatty acid).

The amount of fatty acid required in the solid resin also determines the quantity of epoxide group-containing comonomer to be copolymerised, the comonomer preferably being incorporated in a quantity equivalent to the fatty acid.

Natural drying fatty acids suitable for the process are, for example, linseed oil fatty acid, soya oil fatty acid, cottonseed oil fatty acid, safflower oil fatty acid, tall oil fatty acid, sunflower oil fatty acid, peanut oil fatty acid in the natural composition thereof, i.e. these natural, drying fatty acids represent mixtures of saturated, mono- and/or poly-unsaturated fatty acids having drying properties, the polyunsaturated fatty acids largely containing isolated double bonds. For example, the fatty acids of the above-mentioned oils have substantially the following composition in percent, by weight:

|  |  | Linseed Oil | Soya Oil | Sunflower Oil |
| --- | --- | --- | --- | --- |
| Myristic acid | ($C_{14}$) | 0.2 | — | — |
| Palmitic acid | ($C_{16}$) | 5.6 | 6.5 | 3.5 |
| Stearic acid | ($C_{18}$) | 3.5 | 4.5 | 2.9 |
| Arachic acid | ($C_{20}$) | 0.6 | 0.7 | 0.6 |
| Behenic acid | ($C_{22}$) | — | — | — |
| Lignorceric acid | ($C_{24}$) | 0.1 | — | 0.4 |
| Oleic acid | ($C_{18}$) | 21.0 | 33.5 | 34.1 |
| Linoleic acid | ($C_{18}$) | 24.0 | 52.5 | 58.5 |
| Linolenic acid | ($C_{18}$) | 45.0 | 2.3 | — |

|  | Cottonseed Oil | Peanut Oil | Tall Oil | Safflower Oil |
| --- | --- | --- | --- | --- |
| Myristic acid | 3.3 | 0.5 | — | 0.1 |
| Palmitic acid | 19.9 | 7.8 | 4.6 | 4.5 |
| Stearic acid | 1.3 | 3.1 | 4.6 | 2.0 |
| Arachic acid | 0.6 | 2.4 | — | 0.4 |
| Behenic acid | — | 3.1 | — | 0.4 |
| Lignorceric acid | — | 1.1 | — | — |
| Oleic acid | 29.6 | 56.0 | 30 | 20 |
| Linoleic acid | 45.3 | 26.0 | 24 | 70 |
| Linolenic acid | — | — | 8 | 3 |

The isomerised, drying fatty acids contain from 30 to 75%, by weight, of conjugated fatty acids and may be obtained by isomerising the natural, drying fatty acids. Conjugated fatty acids are $C_{18}$ fatty acids containing at least two conjugated double bonds, examples of which are 9,11-linoleic acid, 10,12-linoleic acid, 8,10-octadecadienoic acid, eleostearic acid (=9,11,13-octadecatrienoic acid), pseudoeleostearic acid (=10,12,14-octadecatrienoic acid), parinaric acid (=9,11,13,15-octadecatetraenoic acid), licanic acid (=4-keto-9,11,13-octadecatrienoic acid) and the stereo-isomers of the above-mentioned acids, preferably 9,11-linoleic acid and elestearic acid and the stereo-isomers thereof.

The isomerisation of the natural drying fatty acids is carried out by known methods and is described, for example, in Ullmanns Enzyklopadie der technischen Chemie, (1956), Vol 7, pages 538 to 539.

The above-mentioned acids are described, for example, in Ullmanns Enzyklopadie der technischen Chemie, (1956), Vol 7, pages 468 to 486; S. Beilstein's Handbuch der organischen Chemie (1961), 4th Edition, Vol 2, 3rd Supplement, pages 1476 to 1520.

The addition of dicarboxylic acid anhydrides with the hydroxyl groups of the thus-obtained fatty acid containing copolymers to form semi-esters, which may become necessary in order to impart gloss, is generally carried out at temperatures of from about 50° to 180° C., preferably from 80° to 150° C. The dicarboxylic acid anhydride is generally used in quantities of up to 3%, by weight, preferably up to 2%, by weight, based on copolymer plus drying fatty acids plus dicarboxylic acid anhydride.

Suitable dicarboxylic acid anhydrides are, for example, succinic acid anhydride, maleic acid anhydride, phthalic acid anhydride, tetrahydrophthalic acid anhydride, hexahydrophthalic acid anhydride, methyl hexahydrophthalic acid anhydride, endomethylene tetrahydrophthalic acid anhydride, halogenated phthalic acid anhydrides, such as tetrachlorophthalic acid anhydride, tetrabromophthalic acid anhydride; 1,4,5,6,7,7-hexachlorobicyclo(2,2,1)-heptene-5-dicarboxylic acid-(2,3)-anhydride, diglycolic acid anhydride. It is preferred to use maleic acid anhydride, phthalic acid anhydride, tetrahydrophthalic acid anhydride and tetrachlorophthalic acid anhydride.

The binders according to the present invention are distinguished by excellent pigment uptake and wetting, minimal yellowing, rapid drying and good processibility and give hardened films characterised by high gloss, good elasticity and hardness.

A crucial advantage over the prior art lies in the fact that the above-mentioned properties may be achieved without limitation to particular fatty acid mixtures, in addition to which it is possible to work with smaller quantities of epoxide component (by comparison with monoglycidyl esters) in the long-oil range.

The binders according to the present invention are dissolved in known manner in organic solvents, for example xylene, mixtures of aromatic hydrocarbons, ethyl glycol acetate, white spirit, and are processed with auxiliaries, such as levelling agents, siccatives, etc., in the conventional quantities, optionally in the form of clear lacquers, but preferably pigmented with the conventional pigments.

Aldoximes or ketoximes, for example butanone oxime, may be used as anti-skinning agents, e.g., in quantities of from 0.1 to 3.0%, by weight, based on solid binder.

The present binders may form the sole binder of a lacquer system. However, they may, of course, also be combined with other resins for modifying properties, as is conventional practice in lacquer chemistry.

Another particular advantage of the binders according to the present invention is that melamine resins may also be added thereto in order to vary the properties of the lacquer films. Through any hydroxyl groups present, melamine resins bring about additional cross-linking, increase hardness and cold check resistance and enable the fresh lacquer coatings to be handled earlier for assembly purposes.

The lacquer films may be produced by conventional methods, such as spread coating, spray coating, dip coating, knife coating etc. on suitable supports, for example of metal, wood, paper, glass, ceramics, stone, concrete, plastics etc. The lacquer films are generally dried at temperatures of from 15° to 30° C. However, lower or higher drying temperatures may also be applied.

The percentages and parts quoted in the following Examples represent percentages and parts by weight, unless otherwise indicated. The acid numbers (AN) are determined in accordance with DIN 53 402 and OH numbers in accordance with DIN 53 240 and are expressed in mg of KOH/g of substance. The molecular weights are determined by osmometry in tetrahydrofuran.

EXAMPLE 1

(a) A copolymer resin is produced in known manner by solution polymerisation at 110° C. from 241.5 parts of styrene, 135.0 parts of fumaric acid bis-glycidyl ester, 124.7 parts of methyl methacrylate, 9.0 parts of butyl acrylate, 3.6 parts of dodecyl mercaptan, 9.0 parts of t-butyl peroctoate and 477.7 parts of xylene. The copolymer solution has a solids content of 50.0%, by weight.

(b) A mixture of 31% of mono-unsaturated $C_{18}$ fatty acids (essentially oleic acid), 10% of tri-unsaturated $C_{18}$ fatty acids (essentially linolenic acid and eleostearic acid) and 51% of di-unsaturated $C_{18}$ fatty acid (essentially 9,12- and 9,11-linoleic acid) is used for esterification with isomerised, drying fatty acids, approximately 45% of the di- and tri-unsaturated fatty acids containing conjugated double bonds. The mixture additionally contains 5% of palmitic acid, 2% of myristic acid and 1% of stearic acid.

264.5 parts of the 50% copolymer solution described in (a) are esterified at 140° C. with 81.6 parts of the fatty acid mixture defined above until an acid number, based on solvent-free esterification product, of 8.5 is reached. The solution has a solids content of 60.1% and a fatty acid content of approximately 38%.

(c) 1.96 parts of tetrahydrophthalic acid anhydride, corresponding to approximately 1.2%, based on solids (=copolymer plus fatty acids plus dicarboxylic acid anhydride), are added to 272.7 parts of the 60.1% solution of the esterification product obtained in accordance with (b). The mixture is heated to 120° C. until a solids content of 59.4%, a viscosity of 24,833 mPa.s at 20° C., an acid number, based on solvent-free semi-ester product, of 11.4 and a hydroxyl number of 62 have been reached. The average molecular weight (number average $\overline{M}n$, as determined by osmometry in tetrahydrofuran) amounts to approximately 9500.

Lacquer formulation: a white lacquer produced from 168 parts of the binder solution of Example 1(c) (59.4%) 65 parts of titanium dioxide pigment (rutile), 121 parts of a xylene mixture of 79.6% of $C_{10}$-aromatic fractions; 6.3% of $C_{11}$-alkyl benzenes; 1.9% of $C_{12}$-alkyl benzenes; 4.2% of naphthalene; 6.2% of $C_9$-aromatic fractions and 1.8% of aliphatic fractions (=Solvesso 150, a commercial product of Esso).

Ethyl glycol acetate ratio, by weight=1:1:1 2.5 parts of a Ca-octoate solution (4% metal content) 3 parts of ethyl glycol acetate 1.5 parts of anti-skinning agent (approximately 55% solution of butanone oxime in white spirit) 1.2 parts of a silicone oil solution (1% in xylene) 1.7 parts of a cobalt octoate solution (6% metal content) 3.3 parts of a zirconium solution (6% metal content) produces the results set out under Example 1 in the Table below.

COMPARISON 1

This comparison test (cf. Table of the present Application) shows that white lacquers of binders according to German Offenlegungsschrift No. 1,720,697, Application Example 1, dry tack-free distinctly more slowly and gel prematurely, compared with white lacquers produced using binders according to the present invention, even after the addition of conventional anti-skinning agents.

The white lacquers produced using binders corresponding to German Offenlegungsschrift No. 1,720,697 in the absence of an anti-skinning agent are not stable in storage.

In accordance with Example 1 of German Offenlegungsschrift No. 1,720,697, a solution of 120 g of styrene, 78 g of methyl methacrylate and 102 g of glycidyl methacrylate in approximately 500 g of xylene is heated for 25 hours under nitrogen at 80° C., following the addition of 2.8 g of azodiisobutyronitrile as catalyst and 0.8 g of dodecyl mercaptan as regulator. Thereafter, the conversion amounts to 100% and a clear colourless polymer solution having an acid number of 1 and a flow-out viscosity (as measured in a 4 mm orifice DIN cup) of 28 seconds at 28° C. is obtained. Following the addition of 194 g of a technical linoleic acid having an acid number of 200, this solution is stirred under nitrogen for 8 hours at 140° C. Thereafter, the acid number thereof amounts to 5, in other words, the addition of the fatty acid with the copolymer is substantially complete.

The clear, pale yellow reaction solution is then stirred under nitrogen for 75 minutes at 140° C. with 25 g of phthalic acid anhydride, after which a solution having a solids content of approximately 50%, by weight, and an acid number of 16, corresponding to an acid number of approximately 32, based on solid binder, is obtained.

EXAMPLE 2

An air-drying copolymer resin is prepared in known manner by polymerising the following constituents in solution:

241.5 parts of styrene, 135.0 parts of maleic acid bisglycidyl ester, 124.7 parts of methyl methacrylate, 9.0 parts of butyl acrylate, 3.6 parts of dodecyl mercaptan, 9.0 parts of t-butyl peroctoate and 477.2 parts of xylene. The reaction temperature is 110° C., the solids content on completion of the reaction 49.4% and the viscosity 549 mPa.s.

Esterification with the isomerised fatty acid mixture according to Example 1(b) is carried out at 140° C. in a quantitative ratio of 1150 parts of copolymer and 350 parts of the fatty acid mixture described above. It results in the formation of a mixture having an acid number of 7, a solids content of 67.4% and a viscosity of 4818 mPa.s at 20° C. The mixture has a fatty acid content of 38.1%.

The reaction of 1328 parts of the fatty acid-modified mixture (solids content 67.4%) with 10.1 parts of tetrahydrophthalic acid anhydride, corresponding to approximately 1.1%, based on solids, at 120° C. gives a copolymer resin having a solids content of 67.6% and a viscosity of 5918 mPa.s at 20° C. The copolymer resin has an acid number of 13.8, based on solvent-free semi-ester product, an OH number of 69 and an average molecular weight (number average $\overline{M}n$) of approximately 7800.

A white lacquer produced in accordance with the lacquer formulation indicated above produced the test results set out in the Table.

EXAMPLE 3

A copolymer resin is produced in the same way as in Example 1 from 62.35 parts of methyl methacrylate, 120.75 parts of styrene, 67.5 parts of fumaric acid bisglycidyl ester, 4.5 parts of butyl acrylate, 1.8 parts of dodecyl mercaptan, 4.5 parts of t-butyl peroctoate and 238.6 parts of xylene at a temperature of 110° C. On completion of the reaction, the copolymer resin has a solids content of 50.4%.

Naturally drying fatty acids, are used for the esterification reaction with drying fatty acids, consisting of a mixture of 75% of di-unsaturated $C_{18}$ fatty acids (essentially linoleic acid), 13% of mono-unsaturated $C_{18}$-fatty acids (essentially oleic acid), 0.5% of tri-unsaturated $C_{18}$-fatty acids (essentially linolenic acid). The mixture additionally contains approximately 1% of lauric acid, 0.5% of myristic acid, 7.5% of palmitic acid and 2.5% of stearic acid.

1322 parts of the 50.4% copolymer solution are esterified at 140° C. with 390 parts of the fatty acid mixture defined above until an acid number, based on the solvent-free esterification product, of 10.7 is reached. The solution has a solids content of 61.2% and a viscosity of 20,354 mPa.s at 20° C. The average molecular weight $\overline{M}n$ is approximately 7300 and the fatty acid content 36.9%.

The binder tested in the lacquer formulation defined in Example 1 produces the results set out in the Table.

EXAMPLE 4

A copolymer resin is produced in the same way as in Example 1 from 311.75 parts of methyl methacrylate 603.75 parts of styrene, 337.5 parts of maleic acid bisglycidyl ester, 22.5 parts of n-butyl acrylate, 9.0 parts of dodecyl mercaptan, 22.5 parts t-butyl peroctoate and 1193 parts of xylene at a temperature of 110° C. On completion of the reaction, the copolymer resin has a solids content of 48.7%. The same mixture as in Example 3 is used for the esterification reaction with drying fatty acids. 661 parts of the 48.7% copolymer solution are esterified at 140° C. with 190 parts of the described fatty acid mixture until an acid number, based on the solvent-free esterification product, of 11.8 is reached. The solution has a solids content of 59.6% and a viscosity of 3627 mPa.s at 20° C. The average molecular weight $\overline{M}n$ amounts to approximately 6900 and the fatty acid content to approximately 37.1%. The test results obtained are set out in the Table.

EXAMPLE 5

1205 parts of styrene, 2600 parts of fumaric acid bisglycidyl ester, 1247 parts of methyl methacrylate, 36 parts of dodecyl mercaptan, 90 parts of t-butyl peroctoate and 4772 parts of xylene are reacted at 110° C. in the same way as in Example 1 to form a copolymer having a solids content of 50.7%.

The fatty acid mixture of Example 1 is used for esterification. A copolymer resin having a solids content of 77.3% and a viscosity of approximately 56,300 mPa.s is produced at 140° C. from 1323 parts of the 50.7% copolymer solution and 1593 parts of the fatty acid mixture defined above. The copolymer resin has a fatty acid content of approximately 70.4%, by weight, an acid number of 11 and a molecular weight $\overline{M}n$ of approximately 7500.

The binder tested in the lacquer formulation defined in Example 1 produces the results set out in the Table.

EXAMPLE 6

A copolymer resin is produced in the same way as in Example 1 from 187.05 parts of methyl methacrylate, 362.25 parts of styrene, 202.5 parts of fumaric acid bisglycidyl ester, 13.5 parts of butyl acrylate, 5.4 parts of dodecyl mercaptan, 13.5 parts of t-butyl peroctoate and 715.8 parts of xylene at a temperature of 110° C. On completion of the reaction, this copolymer resin has a solids content of 50.9%.

Soya oil fatty acid is used for the esterification reaction with drying fatty acids.

991.5 parts of the 50.9% copolymer solution are esterified at 140° C. with 297.5 parts of the fatty acid mixture defined above until an acid number, based on the solvent-free esterification product, of approximately 8.6 is reached. The solution has a solids content of 60.8%, a viscosity of approximately 16,430 mPa.s at 20° C., an average molecular weight $\overline{M}n$ of approximately 8440 and a fatty acid content of approximately 37.1%.

The binder tested in the lacquer formulation defined in Example 1 produces the results set out in the Table.

EXPLANATIONS OF THE TABLE

Layer thickness of the dried films: 50 μm Substrate: glass plates and bodywork panels.

Pigment wetting is determined using pigmented polymer solutions (50%, by weight, of titanium dioxide pigment, based on solid resin) which have been adjusted to a flow-out viscosity of 20 seconds as determined in a DIN-4-cup at 20° C. The thus-diluted lacquer solutions are cast onto glass plates and dried upright at room temperature. The homogeneity of the film is assessed after drying, very good pigment wetting signifying complete homogeneity and very poor pigment wetting showing flocculation of the film (in homogeneity).

"Dust-dry": a cottonwool plug from 2 to 3 cm in diameter is dropped onto a horizontally arranged substrate from a height of 20 cm; after about 10 seconds, an attempt is made to remove the cottonwool plug by blowing. The layer is dust-dry when no hairs stick to the surface.

"Tack-free": the substrate is placed with the lacquer layer on top on a tared balance which is loaded with a counterweight of 1 kg. A small fat-free cottonwool plug from 2 to 3 cm in diameter is placed on the lacquer layer, after which a small metal disc 2 cm in diameter is placed on the cottonwool plug. The disc is then pressed with the finger until the balance is in equilibrium, after which the balance is held in equilibrium for 10 seconds. After removing the metal disc, an attempt is made to remove the cottonwool plug by gentle blowing. The lacquer layer is tack-free when the plug does not adhere to the lacquer layer and does not leave hairs behind either.

The pendulum hardness values quoted were determined by Konig's method in seconds after drying in air for 16 hours, cf. W. Konig, Farbe und Lack, 59, (1953), page 435. The lower the measured value, the softer the film.

Erichsen indentation (elasticity of the film) was measured in accordance with DIN 53 156 in mm. The higher the measured value, the more elastic the film.

Gloss was measured by Gardner's method (ASTM D-523-T).

TABLE

|  | Example 1 | Comparison Example | Example 2 | Example 3 | Example 4 | Example 5 | Example 6 |
|---|---|---|---|---|---|---|---|
| Properties of white laquers with a dry film thickness of 50 μm |  |  |  |  |  |  |  |
| Pigment wetting[1] | 0 | 0 | 0 | 0 | 0 | 0 | 0 |
| Dust-dry (mins) | 30 | 40 | 30 | 25 | 30 | 30 | 20 |
| Tack-free (hours) | 2.5 | 10 | 3 | 2.5 | 3.5 | 3 | 2.5 |
| Film properties after drying for 16 h at 20° C. |  |  |  |  |  |  |  |
| Pendulum hardness (secs) | 23 | lacquer gels after one day | 14 | 34 | 22 | 26 | 32 |
| Finger nail hardness[1] | 2 |  | 2 | 2 | 2 | 2 | 2 |
| Adhesive tape test[1] | 0 |  | 3 | 0 | 3 | 0 | 0 |
| Resistance to super petrol[1] | 0 |  | 2 | 0 | 2 | 0 | 0 |
| Whiteness[1] | 0 |  | 0 | 0 | 0 | 0 | 0 |
| Erichsen indentation (mm) |  |  |  |  |  |  |  |
| After 3 days at 20° C. | 7.6 |  | 9.0 | 8.4 | 8.7 | 7.9 | 8.5 |
| After 10 days at 70° C. | 8.3 |  | 8.5 | 7.9 | 8.4 | 7.3 | 8.0 |
| Gardner gloss (20° C.) |  |  |  |  |  |  |  |
| After 3 days at 20° C. | 90 |  | 90 | 92 | 89 | 88 | 91 |
| After 10 days at 70° C. | 85 |  | 63 | 87 | 65 | 78 | 84 |

[1] general evaluation scale:
0 = excellent, 1 = very good, 2 = good, 3 = satisfactory, 4 = adequate, 5 = inadequate

We claim:

1. A binder composition having a number average molecular weight of from 1,000 to 20,000, said binder comprising a copolymer of from 5 to 55% by weight of at least one member selected from the group consisting of fumaric acid bis-glycidyl ester and maleic acid bis-glycidyl ester and from 95 to 45% by weight of at least one monomer selected from the group consisting of styrene, (meth)acrylic acid alkyl esters having from 1 to 8 carbon atoms in said alkyl moiety and mixtures thereof, said copolymer having been esterified to an acid number of from 3 to 30 mg KOH/g with from 18 to 72% by weight of a fatty acid, said percentage by weight being based on the total weight of said copolymer and said fatty acid and said esterified copolymer having been reacted with up to 3% by weight of dicarboxylic acid anhydride, said percentage by weight being based on the total weight of said copolymer, said fatty acid and said dicarboxylic acid anhydride.

2. A lacquer composition which comprises the binder of claim 2 and a lacquer solvent.

* * * * *